United States Patent [19]

Koledin

[11] Patent Number: 5,233,969
[45] Date of Patent: Aug. 10, 1993

[54] FOOD WARMER UNIT FOR FIELD USE

[76] Inventor: Michael J. Koledin, 2002 Ford Cir., Suite E., Milford, Ohio 45150

[21] Appl. No.: 865,833

[22] Filed: Apr. 9, 1992

[51] Int. Cl.$^5$ .............................................. F24C 1/00
[52] U.S. Cl. .................................... 126/261; 126/20; 126/9 B; 126/56; 126/275 R; 126/19.5; 237/12.3 B
[58] Field of Search ............... 126/20, 19 R, 19.5, 126/261, 266, 9 B, 56, 275 R, 19 M; 165/41, 1, 918; 206/218, 541, 546, 577; 237/12.3 B

[56] References Cited

U.S. PATENT DOCUMENTS

| | | | |
|---|---|---|---|
| 1,213,772 | 1/1917 | McCown | 126/19.5 |
| 1,527,348 | 2/1925 | Chapman | 126/19.5 |
| 1,757,448 | 5/1930 | Cooper | 126/19.5 |
| 2,319,422 | 5/1943 | Maihack | 126/19.5 |
| 2,867,471 | 1/1959 | Coon, Jr. | 126/19.5 X |
| 3,013,548 | 11/1959 | Thomas | 126/19.5 |
| 3,590,802 | 7/1971 | Fried | 126/19.5 |
| 3,809,059 | 5/1974 | Burk et al. | 126/19.5 |
| 3,874,361 | 4/1975 | Parrinello | 126/19.5 |
| 4,162,670 | 7/1979 | Hays | 126/19.5 |
| 4,193,389 | 3/1980 | Ku | 126/451 |
| 4,562,890 | 1/1986 | Matoba | 165/41 |
| 4,706,642 | 11/1987 | Sims et al. | 126/9 B |
| 4,874,033 | 10/1989 | Nicholas | 165/1 |

Primary Examiner—Larry Jones
Attorney, Agent, or Firm—Charles R. Wilson

[57] ABSTRACT

A food warmer unit for use in the field comprises a vessel having walls to form a chamber and a recloseable cover. An inlet port is in communication with the chamber as is an outlet port. The vessel also has a restricting means to hold food canisters in a submerged state within the chamber during use. The food warmer unit is readily connected to a portable heating unit to provide hot water in the chamber and a means to warm food canisters.

20 Claims, 3 Drawing Sheets

FOOD WARMER UNIT FOR FIELD USE

This invention relates to a food warmer unit for food canisters. More particularly, the invention relates to a food warmer unit capable of use in the field whereby a liquid heating medium directly contacts the food canisters to efficiently warm the food.

People have long become accustomed to eating warm food. The food is very conveniently cooked or warmed in the home or commercial establishment. Even many vans and campers now have ranges and ovens which operate off propane gas to provide the traveler with warm food as quickly and conveniently as at home. However, there are occasions when a range or oven is not available. Outdoor campers who trek deep into the woods typically do not try to carry any type of appliance for food warming purposes, other than perhaps a small sterno source of heat. For this type of outdoors person, however, the campfire or other limited use warmer to warm food is a part of the outdoors pleasure.

There are occasions when military personnel are forced to wilderness areas not serve by traditional energy sources. Mobile units are able to provide warm food in many situations. There are still other situations when the personnel finds itself deep into the field and must provide its own food and means of cooking or warming the food. As can be imagined, campfires and sterno heaters simply are not feasible. Thus, even though prepared food products are generally available due to modern packaging methods, there are presently inadequate means of warming the food in an efficient manner.

In accord with a present need, there has now been developed a food warmer unit which is capable of use in the field to warm food canisters is an efficient manner. The food warmer unit is capable of being transported by one or two individuals and capable of use in the field. The unit is particularly of value to military personnel on prolonged campaigns in isolated areas of the world.

SUMMARY OF THE INVENTION

A food warmer unit for field use is capable of warming food canisters by direct contact with a liquid heating medium. The unit comprises an open top vessel having a bottom wall and upstanding walls to form a chamber and a recloseable cover. The vessel has inlet and outlet ports in communication with the chamber. A set of couplings is attached to the ports for connection to a supply hose for supplying the liquid heating medium to the chamber from a heating unit and for connection to a return hose for returning it to the heating unit. The vessel also has a restricting means within the chamber to help retain the food canisters submerged in the heating medium within the chamber.

DETAILED DESCRIPTION OF THE INVENTION

The food warmer unit of the invention is particularly useful for military personnel in the field. This preferred use will be described in the following paragraphs, though the unit is also of use to forest rangers, disaster area personnel such as firemen and other rescue workers and others who are forced to contend with a lack of gas or electric utilities for any extended time.

Figure 1:
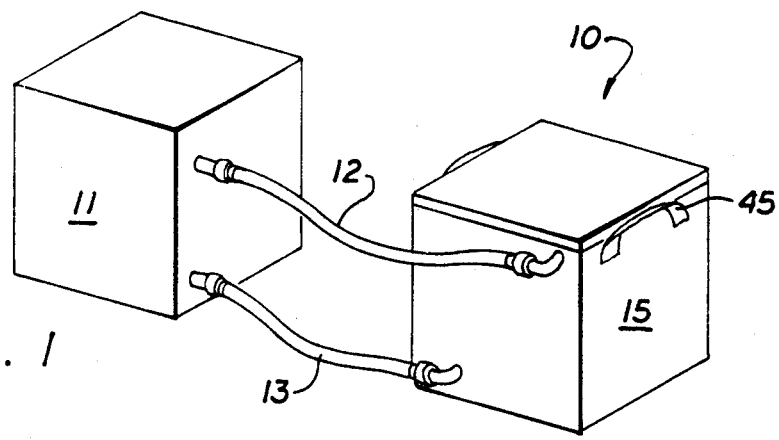
FIG. 1 is an environmental view of the food warmer unit of the invention connected to a heating unit.

With reference to FIG. 1, there is shown the food warmer unit 10 of the invention operably connected to a portable heating unit 11 by means of a supply hose 12 and a return hose 13. The portable heating unit 11 is capable of generating and transferring heat to a liquid heating medium such as water supplied to it by the return hose 13. The heating unit depicted is self-contained. It heats the water as well as pumps it through the supply hose 12. A burner within the unit is operably connected to a small propane tank. A water coil is also contained within the unit with means of connecting it to the return and supply hoses. The burner heats the water as it moves through the water coil within the unit. A rechargeable battery pumps the water as well as supplies power to temperature control mechanisms. Heating units of this nature are well known and are commercially available. Other portable heating units of different designs and powered by other energy sources are also usable.

Figure 2:
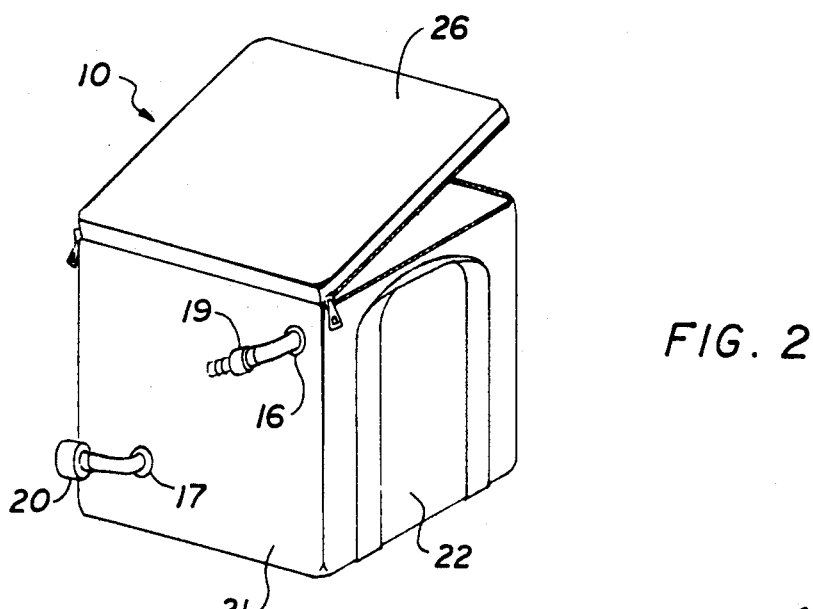
FIG. 2 is a perspective view of the food warmer unit depicted in FIG. 1.
Figure 3:
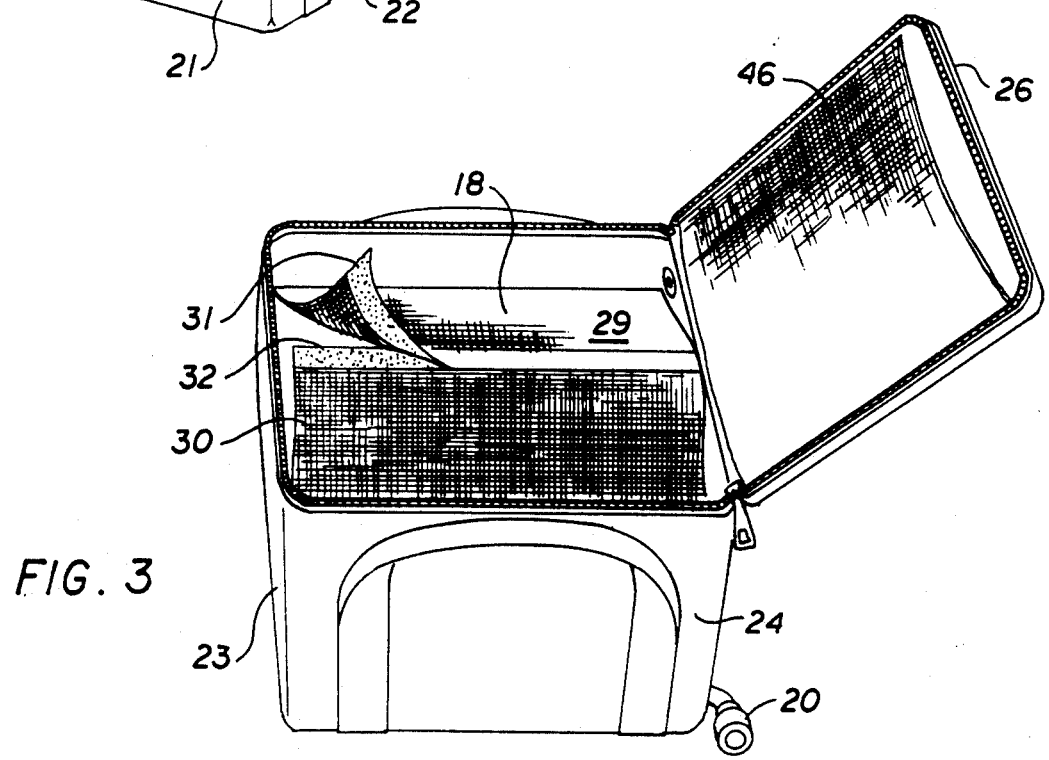
FIG. 3 is a perspective view of the food warmer unit of FIG. 2 as viewed looking into its chamber.

The food warmer unit as best seen in FIGS. 2 and 3 is a vessel 15 having an inlet port 16, an outlet port 17, a restricting hold-down means 18 and couplings 19 and 20. The vessel 15 has a bottom wall and upstanding walls 21, 22, 23, and 24. As shown, the vessel in a box-like structure having a chamber capacity of at least about one and one-half gallons liquid. However, other shapes and sizes of vessels are usable, including cylindrical-shaped vessels. The chamber capacity of the vessel is preferably from about three gallons to about eight gallons liquid. Lesser capacities are possible, though not practical for the end use contemplated while greater capacities tend to reduce the portable nature of the food warmer unit.

The walls of the vessel are made of any durable material, including woven fabrics and polymeric materials. The chamber itself must be water-tight. Accordingly, if the walls are not made of a water impermeable material, then it is necessary to use a water-impermeable liner in the chamber. Preferably, the vessel has canvas walls with a vinyl interior liner. Preferably also, an insulating material such as a polymeric foam is included in the walls to help retain heat. The bottom wall preferably is rigidized by including a rigid insert between the canvas and liner, while the upstanding walls are flexible. The resultant vessel is collapsible for ease of storage and transport.

A closeable cover 26 is hingeably attached to the upstanding wall 21 to close off the chamber during use as an aid in retaining heat in the chamber. An edge of the cover 26 is sewn to an upstanding wall edge, though can be separately attached by Velcro, hinges, etc. Closure means such as a zipper can be provided along the three free edges of the closeable cover and vessel, though are not needed.

The inlet port 16 and the outlet port 17 are positioned in one of the upstanding walls so as to be in communication with the chamber. The couplings 19 and 20 are attached to each port. As seen in FIG. 1, the supply hose 12 and the return hose 13 are attached to the couplings 19 and 20, respectively and lead directly to the heating unit 11. The couplings are preferably quick connect couplings. As readily understood, liquid heating medium flows from the supply hose directly into the chamber. At the same time, the liquid flows from the chamber directly to the return hose.

In one embodiment of the invention, the inlet port leads to a compartment within the upstanding wall. The compartment has a series of spaced holes in one wall which lead into the chamber. As such, a more even delivery of liquid heating medium is fed into the chamber for a more efficient transfer of heat. The liquid could as well be routed to enter the chamber through all the walls. In all embodiments, however, the liquid heating medium directly contacts the canisters to be warmed.

The restricting means 18 is positioned within the chamber to hold the food canisters submerged in the liquid heating medium. As shown, the restricting means is a pair of flexible porous flaps 29 and 30, each having a length approximately equal to the length of the vessel and width approximately one-half that of the vessel. Each flap is attached along one edge to opposite internal walls. Each flap also has Velcro attaching means 31 and 32 along an opposite edge such that the two flaps will adhere to one another. The purpose of the restricting means is to keep the food canisters from floating to the top. Their complete submersion in the heating medium maximizes the unit's efficiency.

Other restricting means can as well be used. For example, a set of straps can extend across the chamber with means to attach their ends together by way of Velcro, buckles or knots.

Figure 4:
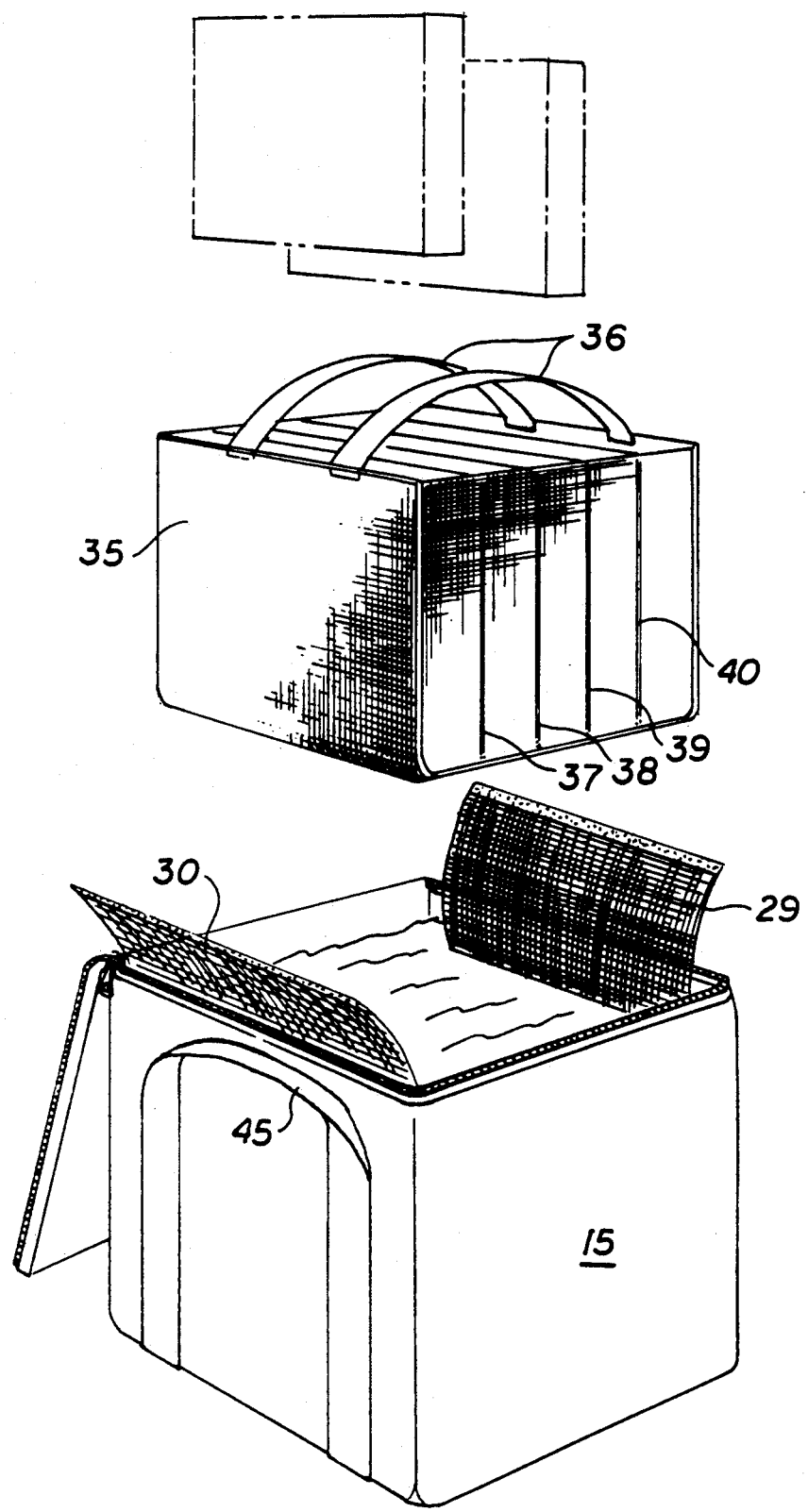
FIG. 4 is an exploded view of the food warmer unit showing a removable pouch used for moving food canisters into and out of the food warmer unit's chamber.
Figure 5:
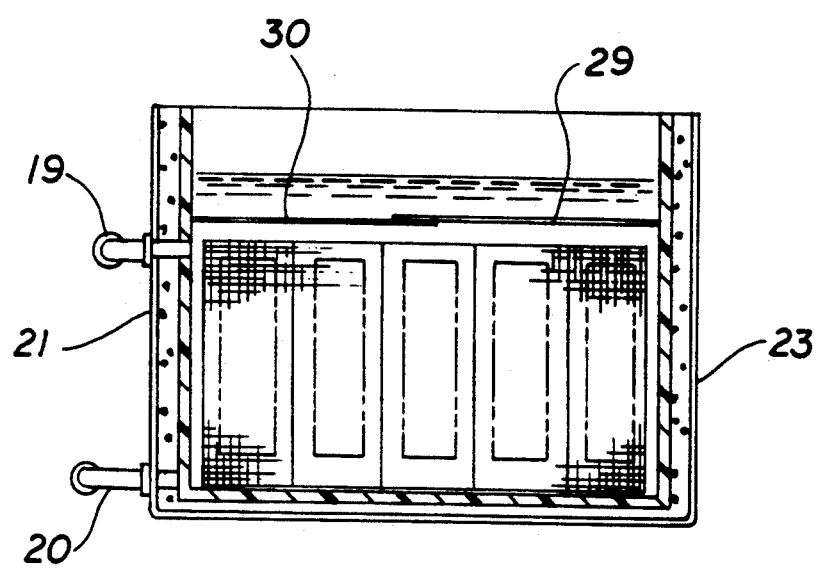
FIG. 5 is an end view in section of the food warmer unit of FIG. 1 showing a set of food canisters submerged in hot water within the chamber of the food warmer.

With reference to FIGS. 4 and 5, there is shown a removable pouch 35 capable of holding a plurality of food canisters, preferably at least three. The pouch is made of a porous material, e.g. a plastic mesh. The pouch provides a means of lowering the canisters into the liquid medium and removing them without making a mess or scalding the individual. The pouch 35 has handles 36 and dividers 37, 38, 39 and 40 to form five compartments.

Again with reference to FIG. 1, the food warmer unit has optional carry handles 45 on two sides of the vessel. The handles are provided merely for ease of carrying the vessel. An optional pocket 46 of mesh material on the underside of the closeable cover adds a degree of flexibility to the unit in that small food items, e.g. shelf-stable bread can be inserted into the pocket and warmed without being submerged into the water.

In operation, initially, the supply hose leading from the heating unit and the return hose leading to the heating unit are connected to the couplings found on the vessel of the food warmer unit. The chamber of the food warmer unit is then filled with water at least to a depth such that the food canisters to be warmed are submerged. The heating unit is now activated. Water is drawn into the heating unit from the return hose, heated and delivered to the food warmer unit through the supply hose. Water is continuously circulated in this manner. Food canisters are placed in the pouch and lowered into the water within the chamber. Finally, the retaining means are secured to hold the canisters in a submerged state and the cover closed to retain heat in the chamber. After a set time, primarily depending on the water's temperature, the pouch is lifted from the chamber. Water draining through the porous pouch is directed back into the chamber to conserve both the water and heat. The food canisters can be removed from the pouch, opened and consumed.

While the invention has been described in particularity with reference to the drawings, it should be understood modifications can be made. All modifications of an obvious nature are considered within the scope of the appended claims.

I claim:

1. A food warmer unit for field use capable of warming food canisters by direct contact with a liquid heating medium, comprising:
   (a) an open top vessel having a bottom wall and upstanding walls to form a water-tight chamber therewithin of sufficient capacity to hold a plurality of food canisters and to hold the liquid heating medium in direct contact for warming said food canisters and further having a closable cover, said vessel having an inlet port in said upstanding wall in communication with said water-tight chamber and an outlet port in said upstanding wall in communication with said water-tight chamber;
   (b) a restricting means positioned within the water-tight chamber to retain the food canisters in a submerged state in said water-tight chamber when said water-tight chamber is filled with the liquid heating medium; and
   (c) a first coupling means attached to the inlet port for attaching thereto a supply hose for supplying the liquid heating medium from a heating unit directly into the water-tight chamber and a second coupling means attached to the outlet port for attaching thereto a return hose for returning the liquid heating medium from the water-tight chamber to the heating unit for reheating.

2. The food warmer unit of claim 1 wherein the vessel has a rigid bottom wall and collapsible upstanding walls permitting the vessel to fold into a compact unit for ease of storage and transportation.

3. The food warmer unit of claim 2 wherein the closable cover has closure means for attaching to the upstanding wall to form a fully enclosed chamber.

4. The food warmer unit of claim 3 wherein the closable cover has a mesh pocket on its underside to hold small food items.

5. The food warmer unit of claim 3 wherein the restricting means is a set of flexible flaps wherein each flap is attached along one edge to the upstanding wall and has releasable attachment means along an opposite edge so as to be releasably secured together during use and capable of separating during non use.

6. The food warmer unit of claim 5 wherein each of the flexible flaps is made of a porous material to allow the free flow of the liquid heating medium therethrough.

7. The food warmer unit of claim 3 wherein the vessel further has a set of handles for ease of movement.

8. The food warmer unit of claim 7 wherein the couplings are quick release couplings.

9. The food warmer unit of claim 3 further having a removable pouch for holding the plurality of food canisters.

10. The food warmer unit of claim 9 wherein the removable pouch is formed from a porous material to allow the free flow of liquid heating medium therethrough.

11. The food warmer unit of claim 10 wherein the pouch has at least three compartments, each compartment dimensioned to hold a food canister.

12. The food warmer unit of claim 3 wherein the vessel has a series of holes in an upstanding wall and the inlet port is in communication with the holes such that the liquid heating medium flowing through the inlet port is directed to the holes and into the chamber as a series of streams.

13. The food warmer unit of claim 12 wherein the inlet port is positioned in an upper portion of the upstanding wall and the outlet port is positioned in a lower portion of the upstanding wall.

14. The food warmer unit of claim 1 wherein the vessel has a capacity of from about three to about eight gallons liquid.

15. The food warmer unit of claim 13 wherein the vessel is a box-like structure.

16. A food warmer unit for field use capable of warming food canisters by direct contact with a liquid heating medium, comprising:
 (a) an open top vessel having a bottom wall and upstanding walls to form a water-tight chamber therewithin of sufficient capacity to hold a plurality of food canisters and the liquid heating medium and further having a closable cover, said vessel having an inlet port in said upstanding wall in communication with said chamber and an outlet port in said upstanding wall in communication with said chamber;
 (b) a restricting means positioned within the chamber to retain the food canisters in a submerged state in said chamber when said chamber is filled with the liquid heating medium, said restricting means being a set of flexible flaps wherein one said flap is attached along one edge to the upstanding wall and the second said flap is attached along one edge to an opposite upstanding wall and each flap has releasable attachment means along an opposite unattached edge so as to be releasably secured together during use and capable of separating during non use; and
 (c) a first coupling means attached to the inlet port for attaching thereto a supply hose for supplying the liquid heating medium from a heating unit directly into the chamber and a second coupling means attached to the outlet port for attaching thereto a return hose for returning the liquid heating medium from the chamber to the heating unit for reheating.

17. The food warmer unit of claim 16 wherein each of the flexible flaps is made of a porous material to allow the free flow of the liquid heating medium therethrough.

18. The food warmer unit of claim 17 wherein the vessel has a rigid bottom wall and collapsible upstanding walls permitting the vessel to fold into a compact unit for ease of storage and transportation.

19. The food warmer unit of claim 18 wherein the closable cover has closure means for attaching to the upstanding wall to form a fully enclosed chamber.

20. The food warmer unit of claim 19 wherein the vessel has a capacity of from about three gallons to about eight gallons liquid.

* * * * *